US005696588A

United States Patent [19]

Wertheim

[11] Patent Number: 5,696,588

[45] Date of Patent: Dec. 9, 1997

[54] AUTOMATIC PLATE SCANNER

[76] Inventor: Abe Wertheim, 921 George's Hill Rd., Southbury, Conn. 06488

[21] Appl. No.: 83,482

[22] Filed: Jun. 30, 1993

[51] Int. Cl.[6] .......................... G01N 21/17; G01N 21/30; G01B 11/28

[52] U.S. Cl. .................... 356/380; 356/425; 250/559.05; 250/559.07

[58] Field of Search .................................... 356/380, 425; 250/559, 201.8, 559.05, 559.07

[56] References Cited

U.S. PATENT DOCUMENTS

| | | | |
|---|---|---|---|
| 4,180,741 | 12/1979 | Palmatier et al. | 356/380 |
| 4,289,405 | 9/1981 | Tobias | 356/407 |
| 4,504,141 | 3/1985 | Yamakoshi | 355/77 |
| 4,512,662 | 4/1985 | Tobias | 356/380 |
| 4,564,290 | 1/1986 | Bell et al. | 356/380 |
| 4,586,148 | 4/1986 | Rehder et al. | 364/50 |
| 4,596,468 | 6/1986 | Simeth | 356/400 |
| 4,660,086 | 4/1987 | Lemelson | 358/183 |
| 4,681,455 | 7/1987 | Jeschke et al. | 356/380 |
| 4,852,485 | 8/1989 | Brunner | 101/211 |
| 4,947,746 | 10/1990 | Jeschke et al. | 101/211 |
| 4,984,073 | 1/1991 | Lemelson | 356/380 |
| 5,029,527 | 7/1991 | Jeschke et al. | 101/365 |
| 5,033,378 | 7/1991 | Ebihara | 101/152 |
| 5,176,974 | 1/1993 | Till et al. | 430/42 |

FOREIGN PATENT DOCUMENTS

| | | | |
|---|---|---|---|
| 0207808 | 12/1982 | Japan | 356/380 |

*Primary Examiner*—F. L. Evans
*Assistant Examiner*—Alexander Oscor Williams
*Attorney, Agent, or Firm*—Joseph B. Taphorn

[57] ABSTRACT

A lithographic plate scanner provides more accurate representations of the color intensity of the various image areas of a plate having a fixed image by using only a single photocell to read the solid color bar, the white color bar and the successive image areas in a column of the plate. The readings are stored and a computer compares the image area readings with respect to the color bar readings and determines the amount of ink that must be flowed when the plate is mounted in a printing press to replicate the color in the printing, and stores the same on a floppy disk which is mounted in the printing press computer when the printing occurs.

18 Claims, 1 Drawing Sheet

AUTOMATIC PLATE SCANNER

INTRODUCTION

1. Field of the Invention

This invention to an automatic plate scanner for a web color printing system wherein a computer controls the amount of a colored ink applied to each area of an image being printed, and more particularly, to an automatic plate scanner whose output can be used with most existing web color printing systems while enabling more faithful reproduction of the color intensity in each area of the plate image being printed.

2. Background of the Invention

In web color printing systems, a lithographic (aluminum) plate has an image fixed on it in a particular color. After scanning to determine the color intensity at various areas thereof, the plate is placed on a roller in the printing press. Also placed in the printing press is the machine record of the scanning, to control through a computer or the like the amount of ink of that color applied to the plate at the various areas according to the intensity of the color thereat as determined by the scanner. Such systems are disclosed in U.S. Pat. No. 5,058,500 issued to Mizuno on Oct. 22, 1991.

The aluminum sheet at its leading edge (as mounted on a printing press roller), has about a one (1) inch wide solid color row followed by about a one (1) inch white row. The two rows, in a scanner, serve as a guage for measuring the color intensity of the various image areas row and column intersections) which are each about one (1) inch square.

Today's scanners (not Mizuno's) generally have an arm which sweeps sideways across the the flat aluminum sheet. A photocell exists for each row of possible image areas and for each of the solid color and white rows. The intensity of an area in a column is determined by comparing the reading of the photocell for that row with the readings of the two photocells for the solid color and white rows, and then calculating the true intensity level. The result is then stored on a floppy disk. The disk is the machine readable media or record which is eventually inserted into the press computer which controls the ink fountain outlets in timed relation.

Hence today's scanner use three (3) individual photocells to determine the color intensity for a given image area. One is the photocell for the particular row in which the column area occurs; the other two are the ones for the solid color and and white rows. It has been observed that all photocells react differently under different situations, and therefor the uniformity of measurement suffers somewhat from row to row. In addition, a different photocell is involved for each image row, creating another source of ambiguity.

3. Additional Prior Art

Other prior art includes U.S. patents to Jeschke et al (U.S. Pat. No. 4,947,746) wherein rows are apparently sensed laterally; Simeth (U.S. Pat. No. 4,596,468) wherein there is apparently not column sensing; Rehder et al (U.S. Pat. No. 4,586,148) wherein there is apparently not column sensing; Jeschke et al (U.S. Pat. No. 5,029,527) wherein there is apparently row sensing; Ebihara (U.S. Pat. No. 5,033,378) which may have column sensing, but not against white and color bars; and Brunner (U.S. Pat. No. 4,852,485) which may have column sensing, but not color and white bars for each photo sensor.

SUMMARY OF THE INVENTION

Accordingly, it is an object of the invention to provide a scanner which enables a more faithful reproduction of image colors in web printing machines.

A further object of the invention is to provide such a scanner which can be easily used with existing web printing systems.

Another object of the invention is to provide such a scanner which is simple and inexpensive of construction and easy of manufacture.

Still another object of the invention is to provide such a scanner which is facile in use and reliable in operation.

The objects of the invention are achieved by a scanner that scans the aluminum plate from front to back. It employs only one photocell per column: the photocell for a particular column first sensing the solid color (top) row and having the reading stored for that column and row in a computer; it next senses the white color (2nd from top) row and has its reading stored for the column and row; and then its senses adjacent areas in successive rows of that column and has the readings stored for that column and the successive rows: the successive row readings for a column being compared to the results of the solid color and white row readings to calculate the true intensities for each area, which intensities are then stored on a floppy disk for later use in the printing press computer. A more faithful reproduction of the image on the lithographic sheet being printed is thus enabled.

BRIEF DESCRIPTION OF THE DRAWINGS OF THE INVENTION

These and other objects, features and advantages of the invention will become apparent from a reading of the following description of a preferred embodiment of the invention, when considered with the appended drawings, wherein:

FIG. 1 is a diagrammatic view of a scanner constructed according to my invention and of a computer suitably programmed and synchronized with the scanner to store the photocells' readings of their respective columns' color and white bar areas and and the compared results of the photocells' readings of the respective columns' image row areas with the stored readings of the respective columns' color and white bar areas to accurately determine the color intensity for each area and record the same; and FIG. 2 is a more enlarged and detailed schematic view of the scanner constructed according to may invention.

DETAILED DESCRIPTION OF A PREFERRED EMBODIMENT OF THE INVENTION

Figure 1:
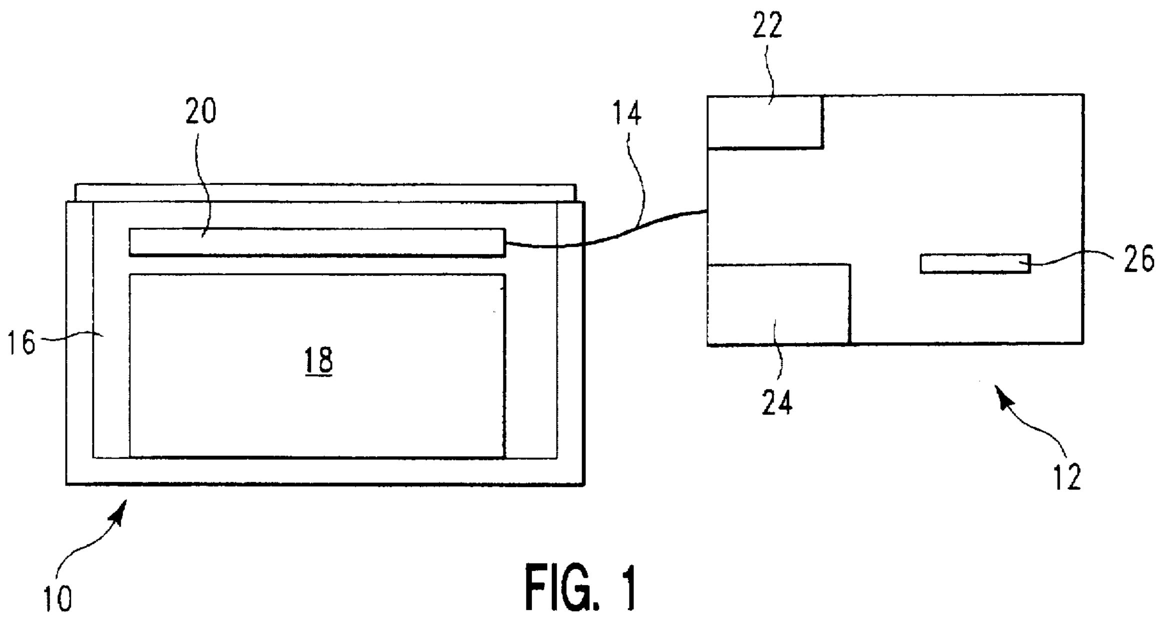

Referring now to the drawings, there is shown in FIG. 1 an automatic plate scanner generally indicated by the numeral 10, and an associated computer generally indicated by the numeral 12 and electrically connected to the scanner by the cable 14.

The plate scanner 10 includes a table top 16 upon which a lithographic (aluminum) plate 18 having an image fixed thereon is placed flat. A scanning bar 20 is shown on the far or top side of the table top, and is adapted to be moved forwards over the plate 18. The scanning bar is connected to the electrical cable 14 connected at its other end to the computer 12.

The computer 12 includes a data processor 22 for handling and comparing data, a memory 24 for storing programs and data under the control of the processor 22, and a slot 26 for insertion and removal of floppy disks on which data has been stored after the completion of data processing operations. Disks removed from the slot 26 are inserted into a printing press computer when the corresponding color lithographic plate 18 is mounted on a printing press roller to print the color.

Figure 2:
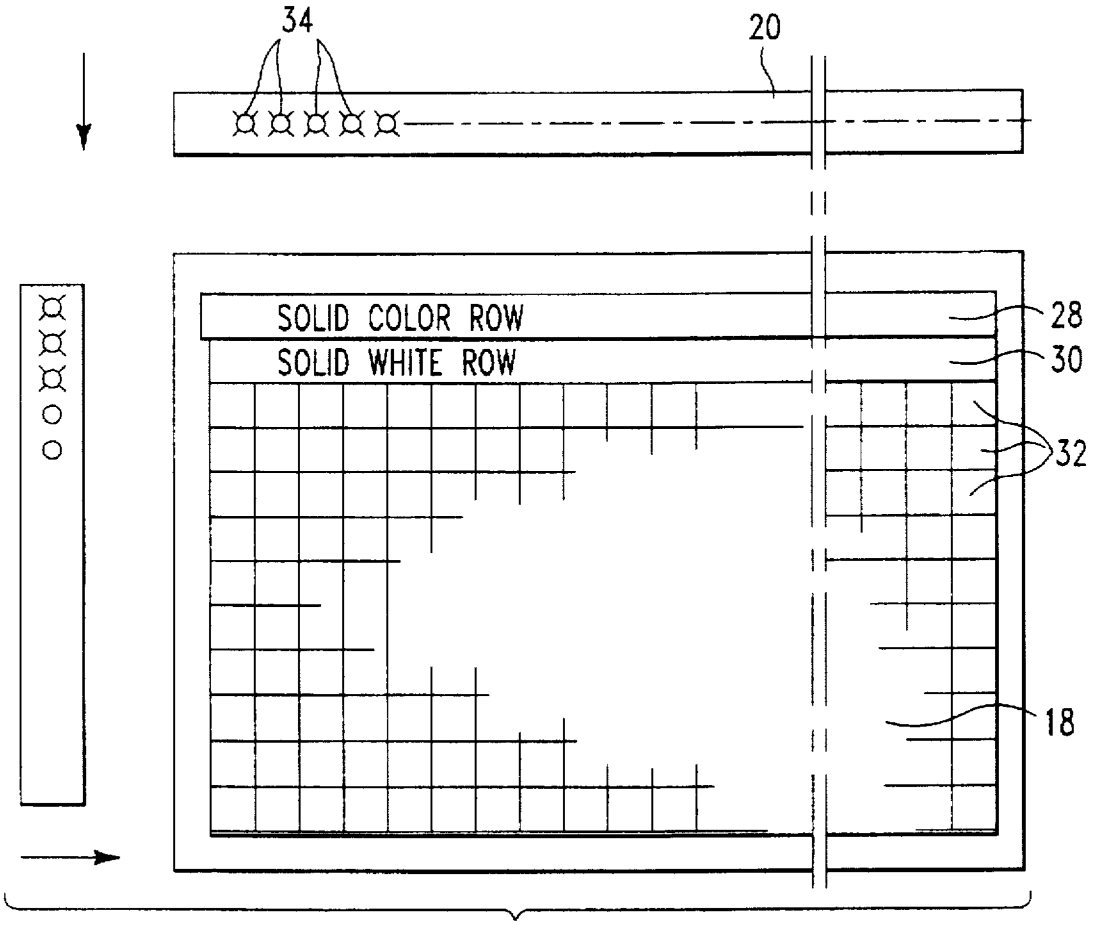

Lithographic plates of the type employed with this invention are well known in the industry. As shown in FIG. 2, the aluminum plate 18 has a first row 28 across it that is a solid bar of the color to be printed. Below it is a second row 30 that is a solid white bar. Below that, figuratively at least, are successive adjacent rows 32 of the image portion of the plate. (The rows can be electronically allocated and need not be physically marked, it being sufficient that the computer knows which row is involved at a given time, based on the relative activity of the scanning bar 20 with respect to the plate 18.

As noted earlier, the scanning bar 20 is adapted to be moved fowards over the plate 18. To this end it is suitably mounted for parallel translation over the plate. The scanning bar carries a plurality of photocells 34, one for each columnar area of the image portion of the lithographic plate to be scanned. Thus as the bar 20 is moved forward (towards the operator) over the plate 18, each photocell 34 first scans the uniformly solid color bar of row 28, then the uniformly solid white bar of row 30, and then successive portions or areas in its column of the image rows 32.

As a photocell 34 senses the solid color bar, its reading is sent to the computer 12 over the cable 14 and stored for that column in conventional fashion. As it next senses the solid white bar, that reading is stored for that column. As it then senses the first image row 32, the reading is sent to the computer where the data processing means compares it to the stored readings to that column (and photocell) and determines the amount of that color ink that must be flowed onto the lithographic plate 12 when mounted in the printing press to replicate the color intensity on the plate.

It should be observed that only one photocell is involved in determining the color intensity for each image area in a column. Thus eliminated are the problems arising from non-uniformity in photocells and not-uniform photocell responses to changing conditions.

Applicant has thus devised an automatic plate scanner that is provides a more faithful reproduction of the image on a lithographic plate than was heretofore possible. In addition, his device is of simple construction and easy to use.

While applicant has described a preferred embodiment of his invention, it will be apparent to those skilled in the art that other and different embodiments may be made using the principles of the invention, and that it is intended to limited only by the scope or spirit of the appended claims.

What is claimed is:

1. In a sensor for a lithographic plate having a solid color area having length and width and a solid white area having length and width and a fixed image, a scanning element relatively movable across the solid color area and the solid white area and the fixed image, and a light sensitive device carried by the scanning element for sensing the solid color area, the solid white area and an area of the fixed image, wherein the solid color area and the solid white area are bars on and extending across the plate.

2. A scanner according to claim 1, wherein the light sensitive device is a photocell.

3. A scanner according to claim 1, wherein a plurality of light sensitive devices are carried by the scanning element.

4. A scanner according to claim 3, wherein the light sensitive devices are juxtaposed so as to scan adjacent columnar areas of the fixed image as the scanning element is moved relative to the plate.

5. A scanner according to claim 4, wherein the light sensitive devices are actuated so as to scan adjacent row areas of the fixed image as the scanning element is moved relative to the plate.

6. A scanner according to claim 1, and apparatus for recording the sensings of the light sensitive device.

7. A scanner according to claim 6, and data processing apparatus for comparing the recorded sensings of the bars and of the fixed image.

8. A scanner according to claim 7, said data processing apparatus also determining the amount of colored ink that must be flowed on the area of the fixed image when the lithographic plate is mounted in a printing press to replicate the plate area's color intensity.

9. A scanner according to claim 8, said data processing apparatus recording the determination on a machine readable media.

10. A scanner according to claim 5, and apparatus for recording the sensing of the light sensitive devices.

11. A scanner according to claim 10, and data processing apparatus for comparing the recorded sensings of the bars and of the fixed image for each light sensitive device.

12. A scanner according to claim 11, said data processing apparatus also determining the amount of colored ink that must be flowed on the areas of the fixed image when the lithographic plate is mounted in a printing press to replicate the plate areas' color intensities.

13. A scanner according to claim 12, said data processing apparatus recording the determinations on a machine readable media.

14. In a method for calculating the true intensity of an image area on an image member, the steps comprising sensing by a photocell a solid color area on the image member, sensing by the same photocell a solid white area on the image member, and sensing by the same photocell the image area on the image member.

15. A method according to claim 14, and storing the sensings.

16. A method according to claim 15, and comparing some of the stored sensings.

17. A method according to claim 16, and determining the amount of colored ink that must be flowed on the area of the fixed image when a lithographic plate bearing the image area is mounted in a printing press to replicate the plate area's color intensity.

18. A method according to claim 17, and storing the determination on a machine readable media.

* * * * *